United States Patent
Qureshi

(10) Patent No.: US 10,110,753 B1
(45) Date of Patent: Oct. 23, 2018

(54) REMOTELY HOSTED MULTIMEDIA TELEPHONY SERVICES

(71) Applicant: Amazon Technologies, Inc., Reno, NV (US)

(72) Inventor: Tipu S. Qureshi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 13/652,963

(22) Filed: Oct. 16, 2012

(51) Int. Cl.
*H04W 4/00* (2018.01)
*H04W 8/24* (2009.01)
*H04M 15/00* (2006.01)
*H04L 29/06* (2006.01)

(52) U.S. Cl.
CPC ......... *H04M 15/57* (2013.01); *H04L 65/1016* (2013.01)

(58) Field of Classification Search
CPC ............ H04M 2215/208; H04M 15/57; H04L 65/1059; H04L 65/1016; H04L 65/1046
See application file for complete search history.

(56) References Cited

U.S. PATENT DOCUMENTS

| | | | | |
|---|---|---|---|---|
| 2003/0055985 | A1* | 3/2003 | Corb et al. ................... | 709/227 |
| 2006/0072569 | A1* | 4/2006 | Eppinger .......... | H04L 29/12009 370/389 |
| 2007/0019548 | A1* | 1/2007 | Krishnamurthy ............. | 370/232 |
| 2007/0206563 | A1* | 9/2007 | Silver et al. .................. | 370/351 |
| 2008/0072569 | A1* | 3/2008 | Moniz ..................... | F01D 5/147 60/226.1 |
| 2009/0178121 | A1* | 7/2009 | Luttge ................... | H04L 63/104 726/4 |
| 2009/0185576 | A1* | 7/2009 | Kisel ..................... | H04L 47/808 370/462 |
| 2010/0118774 | A1* | 5/2010 | Gotthard et al. ............. | 370/328 |
| 2012/0110574 | A1* | 5/2012 | Kumar ................ | G06F 9/45558 718/1 |
| 2012/0135296 | A1* | 5/2012 | Itoi et al. ....................... | 429/159 |
| 2012/0155296 | A1* | 6/2012 | Kashanian .......... | H04L 12/1417 370/252 |
| 2012/0167081 | A1* | 6/2012 | Sedayao ................. | G06F 11/30 718/1 |
| 2012/0240178 | A1* | 9/2012 | Meuninck ........... | H04L 12/2834 725/116 |
| 2012/0287925 | A1* | 11/2012 | Wissing et al. ............... | 370/352 |
| 2013/0067298 | A1* | 3/2013 | Li et al. ........................ | 714/799 |
| 2014/0003337 | A1* | 1/2014 | Majmundar et al. ......... | 370/328 |

* cited by examiner

*Primary Examiner* — Asad Nawaz
*Assistant Examiner* — Jason Harley
(74) *Attorney, Agent, or Firm* — Thomas | Horstemeyer, LLP

(57) ABSTRACT

Disclosed are various embodiments for providing remotely hosted multimedia telephony services. Machine instances are allocated to a customer in response to an initial setup request. The machine instances are configured to provision a suite of multimedia telephony services for multiple users associated with the customer. The suite of multimedia telephony services providing voice telephony, video telephony, or both. A border control aggregator is configured to provide connectivity to an external telecommunications network for the suite of multimedia telephony services.

28 Claims, 5 Drawing Sheets

REMOTELY HOSTED MULTIMEDIA TELEPHONY SERVICES

BACKGROUND

Businesses and other organizations are increasingly turning to internet protocol (IP)-based telecommunications services. IP is a packet-switched protocol, which allows for greater flexibility than previous circuit-switched technologies. IP is also a suitable base upon which to deploy additional multimedia telephony services beyond voice telephony, including video, presence, messaging, and so on. For example, IP Multimedia Subsystem (IMS) is a standardized next-generation networking architecture for telephony services that uses IP and the session initiation protocol (SIP). SIP is a signaling protocol used for controlling communications sessions over IP.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing remotely hosted and scalable telecommunication services. Maintaining an IMS network in-house can be a cumbersome proposition for most organizations. An IMS network can involve numerous different services, which may be executed in many different computing devices. Maintaining device hardware can be costly, and hardware may have to be manually added, reallocated, or otherwise reconfigured on a continuing basis in response to demand for various IMS services. Moreover, the IMS network may be integrated with the public switched telephone network (PSTN), which may involve gateways to circuit-switched connections being maintained in-house. Administrators of the IMS network may need to establish T1 or other legacy circuits with one or more providers to provide connectivity to the PSTN.

Various embodiments of the present disclosure provide remotely hosted telecommunications services to organizations, which frees the organizations from having to maintain infrastructure for IMS services or having to manage network connections to PSTN providers. By remotely hosting the IMS services, hardware and IMS service instances can be scaled, in some cases automatically, to meet demand. Connectivity to the PSTN can be centrally provided for numerous organizations utilizing the remotely hosted telecommunications services through connections to various PSTN peers. In the following discussion, a general description of the system and its components is provided, followed by a discussion of the operation of the same.

Figure 1:
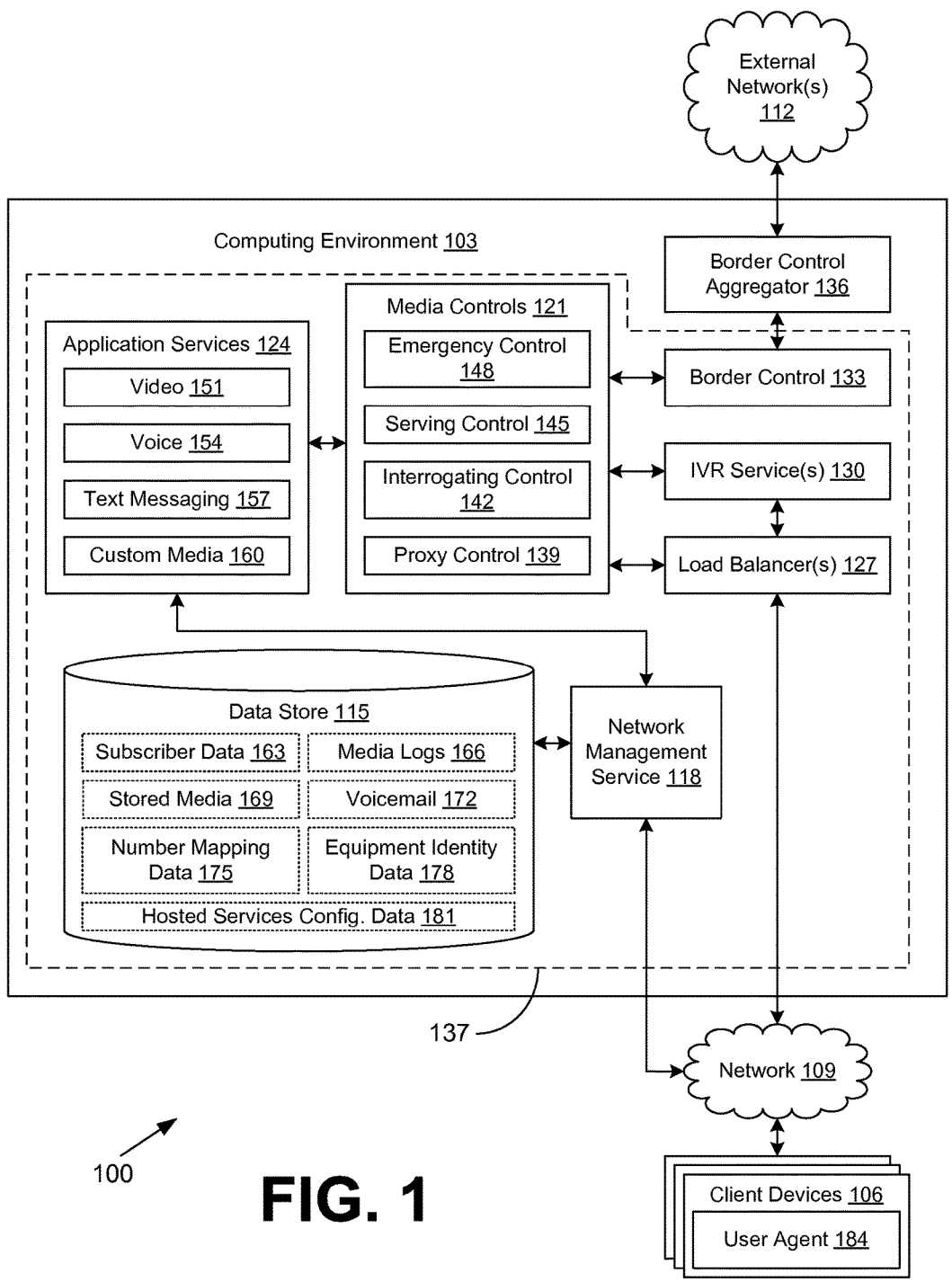
FIG. 1 is a drawing of a networked environment according to various embodiments of the present disclosure.

With reference to FIG. 1, shown is a networked environment 100 according to various embodiments. The networked environment 100 includes a computing environment 103 in data communication with one or more client devices 106 via a network 109. The network 109 includes, for example, the Internet, intranets, extranets, wide area networks (WANs), local area networks (LANs), wired networks, wireless networks, or other suitable networks, etc., or any combination of two or more such networks. The computing environment 103 may also be in data communication with one or more external networks 112. The external networks 112 may correspond to one or more peering providers of connectivity to the PSTN.

The computing environment 103 may comprise, for example, a server computer or any other system providing computing capability. Alternatively, the computing environment 103 may employ a plurality of computing devices that may be employed that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. In particular, the computing environment 103 may be configured to implement IMS on behalf of various customers. Also, various data is stored in a data store 115 that is accessible to the computing environment 103. The data store 115 may be representative of a plurality of data stores 115 as can be appreciated. The data score 115 may be scalable to use an increased or decreased quantity of data storage resources across a plurality of data stores 115. The data stored in the data store 115, for example, is associated with the operation of the various applications and/or functional entities described below.

The components executed on the computing environment 103, for example, include a network management service 118, a plurality of media controls 121, a plurality of application services 124, one or more load balancers 127, one or more interactive voice response (IVR) services 130, one or more border controls 133, a border control aggregator 136, and other applications, services, processes, systems, engines, or functionality not discussed in detail herein. In one embodiment, the network management service 118, the media controls 121, the application services 124, the load balancers 127, the IVR services, and the border controls 133 may be in a customer-managed environment 137. In one embodiment, the customer-managed environment 137 is configured as a virtual private network within the computing environment 103. The customer-managed environment 137 may be duplicated in the computing environment 103 for any number of customers of the operator of the computing environment 103. The border control aggregator 136 may be external to the customer-managed environment 137.

The network management service 118 is executed to manage the configuration of computing resources within the computing environment 103 that are allocated to customers. The network management service 118 may manage launching various machine instances in the computing environment 103, assigning various IMS services to various machine instances, terminating machine instances, reconfiguring machine instances, and so on. The network management service 118 may manage automatic scaling of computing resources for a customer based at least in part on parameters configured by or on behalf of the customer. In some embodiments, the network management service 118 may include home subscriber server (HSS) functionality. The network management service 118 may include logging functionality to record telecommunications sessions such as voice calls, video conferences, and so on.

The media controls 121 include various IMS services that perform call session control functions (CSCF), which can include registration, session establishment, session teardown, feature activation, and so on. To this end, the media controls 121 may include a proxy control 139, an interrogating control 142, a serving control 145, and an emergency control 148, among others. The proxy control 139 may correspond to the first contact point for a user agent. The proxy control 139 may provide quality of service (QoS) functions, and may route traffic to the serving control 145.

The interrogating control 142 corresponds to the entry point for incoming calls and is used in network-to-network signaling. The interrogating control 142 determines the serving control 145 for subscribers. The interrogating control 142 also functions to hide the IMS network topology from external networks 112. The serving control 145 serves as a registrar and provides session control and application interface functions. The serving control 145 may also check for triggers for services and perform routing, although routing instructions may come from application services 124. The emergency control 148 may handle certain functions for emergency sessions, e.g., routing emergency requests to the appropriate emergency call center, etc.

The application services 124 provide various media services. For example, the application services 124 may include video 151, voice 154, text messaging 157, custom media 160, and so on. The application services 124 may implement features such as push to talk, instant messaging, telephony, video conferencing, presence, and so on.

The load balancers 127 are configured to route requests from client devices to various media controls 121, IVR services 130, and other IMS services so as to evenly distribute the load. The IVR services 130 may provide various services such as voicemail, extension directories, automated assistance features, and so on. The border control 133 may correspond to a breakout gateway control function (BGCF) service that is configured to select a network, e.g., a media gateway control function (MGCF) or another BGCF, in which "breakout" to the PSTN or public land mobile network (PLMN) is to occur. To this end, the border control 133 routes traffic to and from the border control aggregator 136, which in turn routes traffic to and from the external networks 112 that connect to the PSTN and/or the PLMN.

The border control aggregator 136 aggregates SIP traffic across multiple customers of the computing environment 103. The border control aggregator 136 may function as a master BGCF node and may route traffic to various peering partners having the external networks 112. Customer traffic that passes through the border control aggregator 136 may be limited or controlled based at least in part on a number of incorrect messages, traffic reputation, and other factors.

The data stored in the data store 115 includes, for example, subscriber data 163, media logs 166, stored media 169, voicemail 172, number mapping data 175, equipment identity data 178, hosted services configuration data 181, and potentially other data. The subscriber data 163 may correspond to HSS data and may include user profile data, filter criteria, and/or other data. The media logs 166 may log communications sessions and messages relating to the application services 124. Such media logs 166 may be for customer use, hosting provider use, law enforcement/governmental use, etc. In one non-limiting example, a media log 166 may include recorded voice calls. The stored media 169 may correspond to voice, video, text messages, etc. which have been stored. The voicemail 172 may include data implementing voicemail for various users of the system established for the customer.

The number mapping data 175 may include telephone number mapping data, e.g., according to the E.164 number mapping (ENUM) standard. The number mapping data 175 may employ special domain name system (DNS) record types to translate a telephone number into a uniform resource identifier (URI) or an IP address. The equipment identity data 178 may correspond to data implementing an equipment identity register (EIR). Such an EIR may keep track of unique identifiers associated with client devices 106 that are permitted to use telecommunications resources in the customer-managed environment 137. A non-limiting example of a unique identifier is an international mobile equipment identity (IMEI).

The hosted services configuration data 181 includes various configuration parameters for the customer-managed environment 137 that may be established by or on behalf of the customer. Such parameters may, for example, control auto-scaling for various services or machine instances in the customer-managed environment 137. As a non-limiting example, the hosted services configuration data 181 may define thresholds for scaling services, machine instances, bandwidth, and/or other resources based at least in part on cost, call volume, call volume relating to certain numbers that are high priority, call volume excluding certain numbers that are low priority, and/or other factors.

The client devices 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client devices 106 may include various input and output devices. The client devices 106 may correspond to user equipment (UE) and may execute a user agent (UA) 184 for SIP sessions. Communication between the UA 184 and the proxy control 139 may be encrypted using transport layer security (TLS), secure sockets layer (SSL), virtual private network tunneling, and/or other encryption technologies.

The client devices 106 may be configured to execute various applications such as a client application and/or other applications. The client application may be executed in a client device 106, for example, to access network content served up by the computing environment 103 and/or other servers. The client application may, for example, correspond to a browser, a mobile application, etc.

Figure 2:
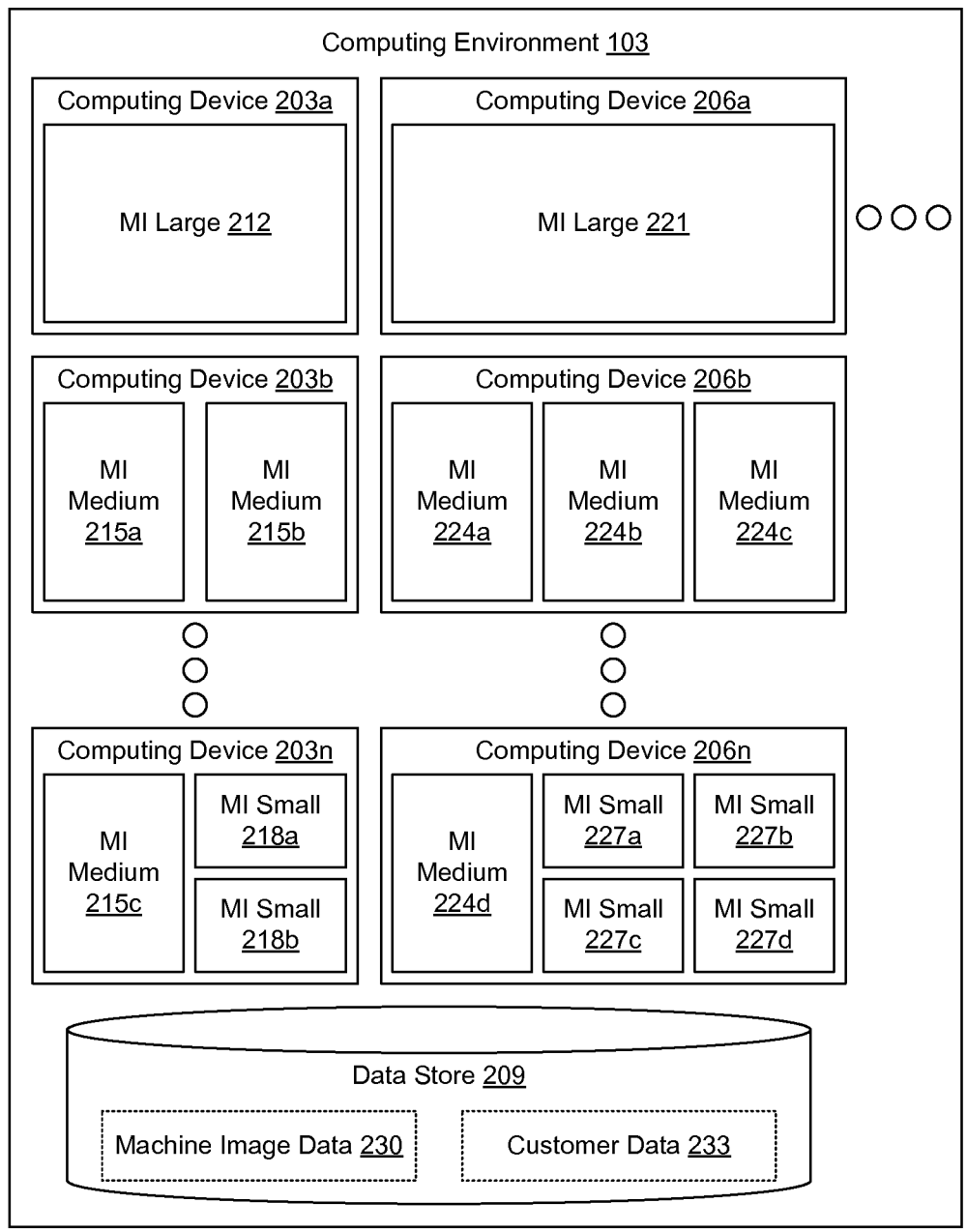
FIG. 2 is a drawing of an example of one configuration of a computing environment in the networked environment of FIG. 1 according to various embodiments of the present disclosure.

Referring next to FIG. 2, shown is one example of a computing environment 103 according to various embodiments. The computing environment 103 includes a plurality of computing devices 203a, 203b . . . 203n, a plurality of computing devices 206a, 206b . . . 206n, and a data store 209. Such components of the computing environment 103 may be in data communication with each other and/or external computing devices by way of a network 109 (FIG. 1). Such computing devices 203 and 206 may be located in a single installation or may be dispersed among many different geographical locations.

The computing devices 203 and 206 may correspond to differing hardware platforms in various embodiments. Accordingly, the computing devices 203 and 206 may have differing hardware configurations of resources, for example, of central processing units (CPUs) that provide general-purpose processing resources, graphics processing units (GPUs) that provide graphics processing resources, system memory, data storage characteristics such as capacity, storage bandwidth, and storage input/output operations per second (IOPS), network bandwidth, and/or other hardware characteristics. In one embodiment, all computing devices 203a, 203b . . . 203n may have a first hardware configuration, while all computing devices 206a, 206b . . . 206n may have a second hardware configuration.

For example, the computing devices 203 may have a certain ratio of a first type of resource to a second type of resource, while the computing devices 206 may have a different ratio of the first type of resource to the second type of resource. In a specific example, the computing devices 203 may have a relatively high amount of memory, while the computing devices 206 may have a relatively high amount of CPU resources. In another specific example, the computing devices 203 may have a relatively high amount of CPU resources, while the computing devices 206 may have a relatively high amount of GPU resources. Although only two sets of computing devices 203 and 206 are shown, it is understood that there may be any number of sets of computing devices 203 and 206 having different hardware configurations.

Each computing device 203, 206 may execute one or more machine instances (MI). A machine instance may correspond to an actual physical machine or to a virtual machine. A virtual machine instance is a virtualized computer system, or a software implementation of a physical computing system. Virtual machines may provide for multiple and/or different operating system environments to run concurrently on a single system having a processor circuit and a memory. As a non-limiting example, multiple instances of a Linux® operating system environment may execute concurrently with multiple instances of a Microsoft® Windows® operating system environment on a single system. Each machine instance may be controlled by different customers, who may have administrative access only to their own instance(s) and no access to the instances of other customers. Multiple machine instances may in fact execute concurrently on a computer system including parallel processors, although multiple instances may appear to execute concurrently on a multithreaded computer system with fewer processors than instances.

Different types of machine instances may be available. In the example of FIG. 2, computing devices 203 may support three types of machine instances: MI large 212, MI medium 215, and MI small 218, each of which may be associated with differing resource configurations. As a non-limiting example, each MI large 212 instance may have four CPU-equivalent units, 15 GB of system memory, and 1,000 GB of data storage. Each MI medium 215 instance may have two CPU-equivalent units, 10 GB of system memory, and 600 GB of data storage. Also, each MI small 218 instance may have one CPU-equivalent unit, 5 GB of system memory, and 250 GB of data storage. In the example of FIG. 2, computing devices 206 may also support three types of machine instances, namely, MI large 221, MI medium 224, and MI small 227. MI large 221, MI medium 224, and MI small 227 may have the same respective configurations as MI large 212, MI medium 215, and MI small 218 or may have different configurations as desired. As a non-limiting example, a MI large 221 instance may have four CPU-equivalent units, 20 GB of system memory, and 1,000 GB of data storage. Certain types of machine instances may be more suited for executing certain IMS services over others.

The example of three types of machine instances for each type of computing device 203, 206 is not intended to be limiting. In various embodiments, there may be more or fewer types of machine instances for each type of computing device 203, 206. In one embodiment, a machine instance may comprise an allocation of an entire computing device 203, 206 with no virtualization.

In the example of FIG. 2, one MI large 212 instance is executing on computing device 203a, two MI medium 215a, 215b instances are executing on computing device 203b, one MI medium 215c instance and two MI small 218a, 218b instances are executing on computing device 203n, one MI large 221 instance is executing on computing device 206a, three MI medium 224a, 224b, 224c instances are executing on computing device 206b, and one MI medium 224d instance and four MI small 227a, 227b, 227c, 227d instances are executing on computing device 206n. Each machine instance may be associated with a customer, though any customer may be associated with any number of machine instances.

In various embodiments, a customer may be capable of launching new machine instances and/or terminating machine instances dynamically. Thus, the computing environment 103 may provide elastic computing capability to the customer that can vary over time.

Various applications and/or other functionality may be executed in the machine instances and in the computing devices 203, 206 according to various embodiments. Also, various data is stored in a data store 209 that is accessible to the computing devices 203, 206. The data store 209 may be representative of a plurality of data stores 209 as can be appreciated. The data stored in the data store 209 includes, for example, machine image data 230, customer data 233, and potentially other data.

Machine image data 230 may include data used to launch a machine instance. Machine image data 230 may include one or more disk images of an operating system environment. Some of the disk images may be preconfigured for use by any customer or subset of customers, while others may be customized for a particular customer or subset of customers. In one embodiment, one disk image may be loaded by multiple machine instances.

The customer data 233 may include customer-specific data. In one embodiment, all customer configuration data for a machine instance is stored in customer data 233. In this way, such data may be easily shared among many machine instances. However, it is understood that in some embodiments customer-specific data may be stored within local data storage associated with a machine instance. The data stored by the customer data 233 may correspond to the data stored by the scalable data store 115 (FIG. 1).

Referring now to both FIGS. 1 and 2, a general description of the operation of the various components of the networked environment 100 is provided. To begin, a customer configures an account with the operator of the computing environment 103. The customer may correspond, for example, to a business or other organization associated with many users. The customer may submit an initial request to provision or setup a suite of multimedia telephony services to the network management service 118. The suite of multimedia telephony services may correspond, for example, to an IMS suite, etc. To this end, the customer may access one or more network pages generated by servers in the computing environment 103 and submit an initial setup request.

In response to the initial setup request, various machine instances (e.g., MI large 212, MI medium 215, MI small 218, etc.) in the computing environment 103 may be allocated to the customer by the network management service 118. The network management service 118 may configure the machine instances to provision the suite of multimedia telephony services. To this end, the network management service 118 may configure one or more machine instances to host load balancers 127, one or more machine instances to host media controls 121, one or more machine instances to host application services 124, one or more machine instances to host IVR services 130, one or more machine instances to host a border control 133, and so on. Various default configurations for machine instances may be loaded from the machine instance data 230. In some cases, a machine instance may host more than one IMS service. In some cases, a single IMS service may be hosted across multiple machine instances. The network management service 118 may also configure a scalable data store 115 with initial data to support the suite of multimedia telephony services.

The network management service 118 may configure a virtual private network among the various multimedia telephony services, thereby creating a customer-managed environment 137 for the customer that is separated from other customer-managed environments 137 hosted by the computing environment 103 that provide similar services to other customers. Accordingly, the computing environment 103 may provide a suite of multimedia telephony services to a multitude of different customers, each having customer-controlled services on centrally hosted infrastructure.

To facilitate connections to the PSTN and/or the PLMN, the network management service 118 may configure the border control 133 for the customer-managed environment 137 to route telephony traffic to a border control aggregator 136 that is coupled to one or more external networks 112. The border control aggregator 136 may aggregate the telephony traffic from multiple customer-managed environments 137 and route the aggregated traffic to the external networks 112, which may correspond to peers with whom the operator of the computing environment 103 may have SIP peering agreements. The peers may provide access to the PSTN and/or the PLMN.

The border control aggregator 136 may be configured to control and/or limit the telephony traffic associated with a customer (i.e., associated with a customer-managed environment 137). To this end, the border control aggregator 136 may control/limit traffic based at least in part on an incorrect messages metric associated with the customer, a traffic reputation metric associated with the customer, and/or other factors. The telephony traffic may be required to follow correct IMS protocol and messaging standards, and traffic not meeting such standards may result in incorrect messages being counted toward the incorrect messages metric and/or the traffic reputation metric. Customers who adhere to specified message and call formats may be allowed more traffic through the border control aggregator 136.

The network management service 118 may also provide scaling functionality for the customer-managed environment 137. Scaling may be done automatically and/or in response to requests obtained from customers. Scaling may involve upscaling resources (e.g., allocating new machine instances to customers, reallocating larger machine instances to customers, allocating more bandwidth, etc.) and downscaling resources (e.g., deallocating existing machine instances, reallocating smaller machine instances to customers, allocating reduced bandwidth, etc.).

Scaling may be based at least in part on a current cost for machine instances, e.g., additional machine instances may be allocated if the current cost meets one threshold, existing machine instances may be deallocated if the current cost meets another threshold, and so on. Further, scaling may be based on a metric associated with utilization of the suite of multimedia telephony services. If call volume meets a threshold, additional machine instances may be allocated to handle additional application services 124, media controls 121, IVR services 130, load balancers 127, and other IMS services. Various thresholds, triggers, and/or other parameters may be configured for the customer in the hosted services configuration data 181.

As part of the scaling, one or more IMS services may be migrated from one machine instance to another. Also, various IMS services may be converted or re-provisioned as needed. For example, a proxy control 139 may be converted into a border control 133 in order to conserve resources. Various other techniques relevant to scaling telephony resources are discussed in U.S. patent application Ser. No. 12/624,375 entitled "SYSTEMS AND METHODS FOR ALLOCATION OF TELEPHONY RESOURCES ON-DEMAND" and filed on Nov. 23, 2009, which is incorporated herein by reference in its entirety.

Figure 3A:
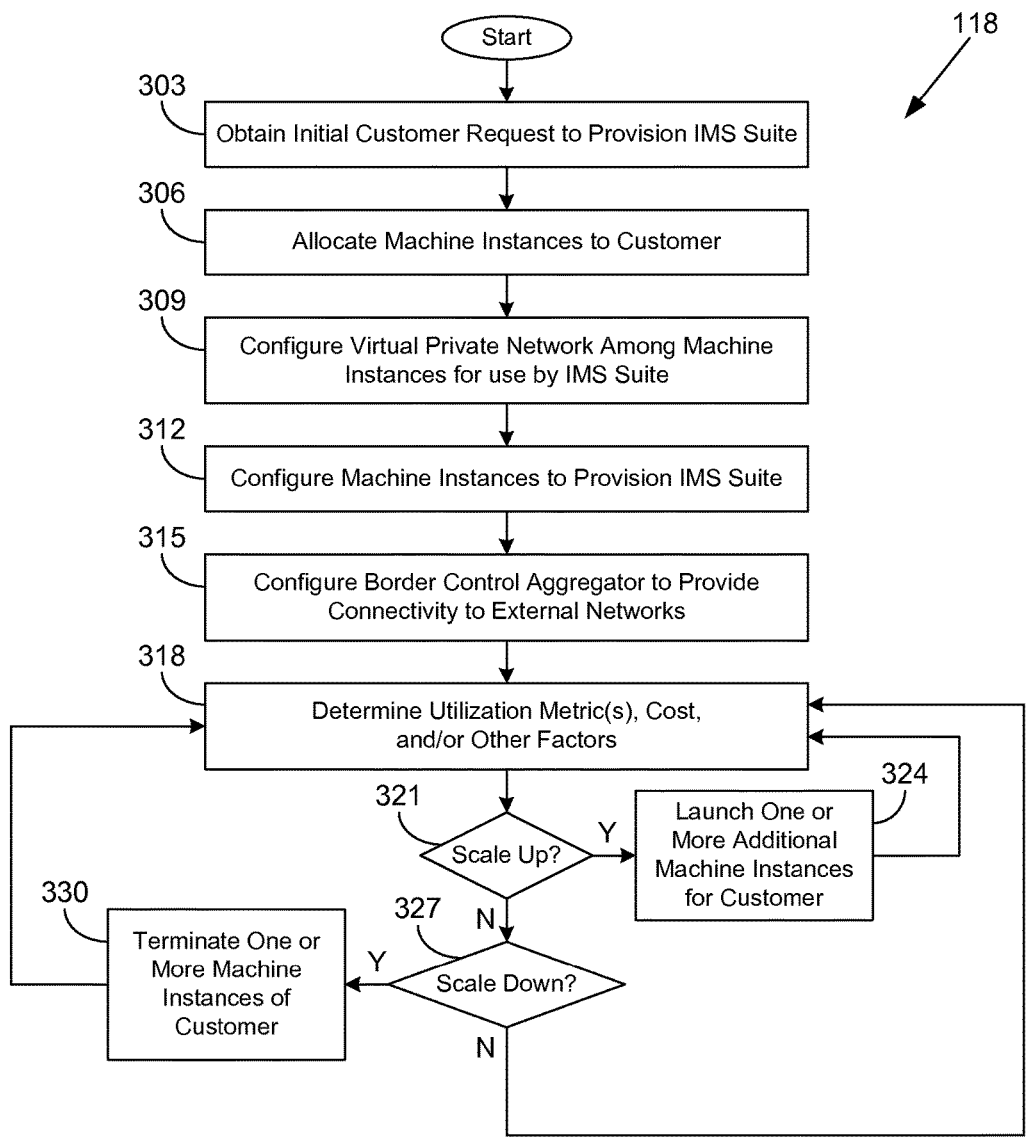
FIG. 3A is a flowchart illustrating one example of functionality implemented as portions of a network management service executed in a computing environment in the networked environment of FIG. 1 according to various embodiments of the present disclosure.

Referring next to FIG. 3A, shown is a flowchart that provides one example of the operation of a portion of the network management service 118 according to various embodiments. It is understood that the flowchart of FIG. 3A provides merely an example of the many different types of functional arrangements that may be employed to implement the operation of the portion of the network management service 118 as described herein. As an alternative, the flowchart of FIG. 3A may be viewed as depicting an example of steps of a method implemented in the computing environment 103 (FIG. 1) according to one or more embodiments.

Beginning with box 303, the network management service 118 obtains an initial customer request to provision an IMS suite. In box 306, the network management service 118 allocates a plurality of machine instances to the customer, which may be an organization associated with many users. In box 309, the network management service 118 configures a virtual private network among the machine instances for use by the IMS suite. In box 312, the network management service 118 configures the allocated machine instances to provision the IMS suite. The IMS suite thus provides voice telephony, video telephony, text messaging, and/or other services.

In box 315, the network management service 118 configures the border control aggregator 136 (FIG. 1) to provide connectivity to one or more external networks 112 (FIG. 1). In box 318, the network management service 118 determines utilization metric(s), current cost of computing resources, and/or other factors. In box 321, the network management service 118 determines whether to scale up the computing resources based at least in part on one or more of these factors.

If the network management service 118 determines to scale up resources, the network management service 118 moves to box 324 and launches one or more additional machine instances allocated to the customer. In addition, the network management service 118 may migrate IMS services from one machine instance to another, convert one IMS service to another, shut down one or more IMS services, launch new instances of IMS services, and so on in response to the scaling. The network management service 118 then returns to box 318 and continues determining metrics, cost, and other factors.

If, instead, the network management service 118 determines not to scale up resources, the network management service 118 continues from box 321 to box 327. In box 327, the network management service 118 determines whether to scale down resources. If the network management service 118 determines to scale up resources, the network management service 118 moves to box 330 and terminates one or more additional machine instances allocated to the customer. In addition, the network management service 118 may migrate IMS services from one machine instance to another, convert one IMS service to another, shut down one or more IMS services, launch new instances of IMS services, and so on in response to the scaling. The network management service 118 then returns to box 318 and continues determining metrics, cost, and other factors. If the network management service 118 determines neither to scale up nor scale down resources, the network management service 118 also returns to box 318.

Figure 3B:
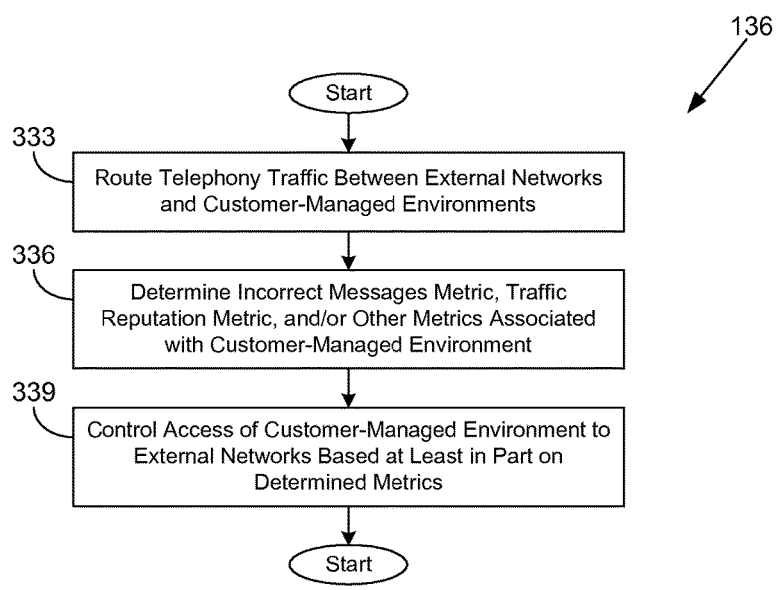
FIG. 3B is a flowchart illustrating one example of functionality implemented as portions of a border control aggregator executed in a computing environment in the networked environment of FIG. 1 according to various embodiments of the present disclosure.

Turning now to FIG. 3B, shown is a flowchart that provides one example of the operation of a portion of the border control aggregator 136 according to various embodiments. It is understood that the flowchart of FIG. 3B provides merely an example of the many different types of functional arrangements that may be employed to implement the operation of the portion of the border control aggregator 136 as described herein. As an alternative, the flowchart of FIG. 3B may be viewed as depicting an example of steps of a method implemented in the computing environment 103 (FIG. 1) according to one or more embodiments.

Beginning with box 333, the border control aggregator 136 routes telephony traffic between external networks 112 (FIG. 1) and customer-managed environments 137 (FIG. 1). In box 336, the border control aggregator 136 determines incorrect messages metrics, traffic reputation metrics, and/or other metrics associated with the customer-managed environment 137. In box 339, the border control aggregator 136 controls or limits access of the customer-managed environment 137 to one or more of the external networks 112 based at least in part on the incorrect messages metrics, traffic reputation metrics, and/or other metrics determined in box 336. Thereafter, the portion of the border control aggregator 136 ends.

Figure 4:
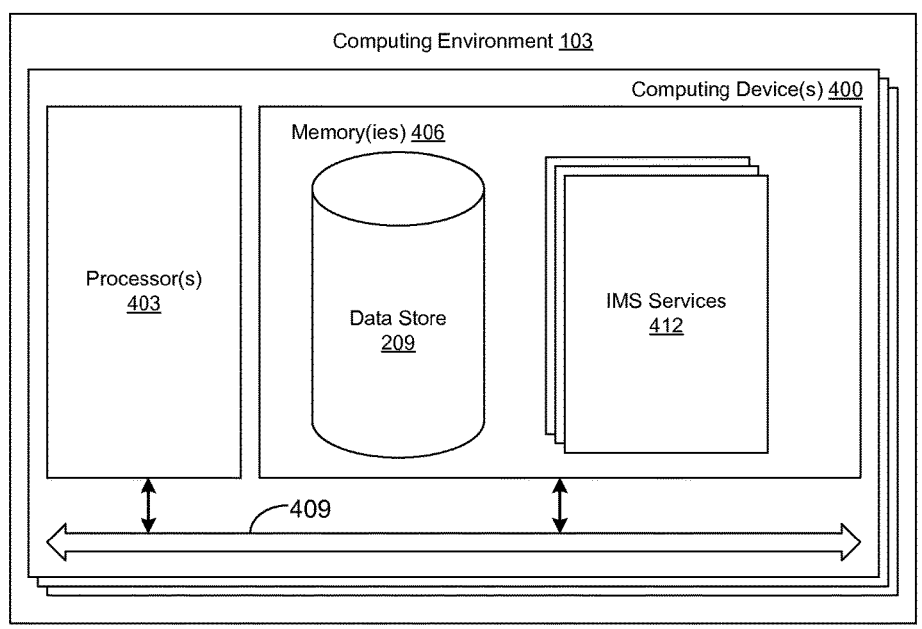
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 includes one or more computing devices 400. The computing devices 400 may represent the different types of computing devices 203, 206 represented in FIG. 2. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are IMS services 412, which may correspond to application services 124 (FIG. 1), media controls 121 (FIG. 1), border controls 133 (FIG. 1), border control aggregators 136 (FIG. 1), IVR services 130 (FIG. 1), load balancers 127 (FIG. 1), network management services 118 (FIG. 1), and potentially other applications. Also stored in the memory 406 may be a data store 209 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the IMS services 412 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A and 3B show the functionality and operation of an implementation of portions of the network management service 118 and the border control aggregator 136. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3A and 3B show a specific order of execution, it is understood that the order of execution may differ from that which is depicted. For example, the order of execution of two or more blocks may be scrambled relative to the order shown. Also, two or more blocks shown in succession in FIGS. 3A and 3B may be executed concurrently or with partial concurrence. Further, in some embodiments, one or more of the blocks shown in FIGS. 3A and 3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the IMS services 412, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program that, when executed by at least one computing device, causes the at least one computing device to at least: obtain an initial request from a customer to set up a suite of multimedia telephony services including a plurality of multimedia telephony services to provide the plurality of multimedia telephony services for a plurality of users associated with the customer; allocate a plurality of machine instances in a networked plurality of computing devices for the customer in response to the initial request, at least one of the plurality of machine instances being a virtual machine; configure a virtual private network among the plurality of machine instances for use by the suite of multimedia telephony services; configure the plurality of machine instances to provision the suite of multimedia telephony services, the suite of multimedia telephony services providing voice telephony, video telephony, text messaging, or any combination thereof; configure a gateway to provide connectivity to a public switched telephone network (PSTN) for the suite of multimedia telephony services through a plurality of external peering networks, the gateway controlling telephony traffic associated with the customer based at least in part on an incorrect messages metric, a traffic reputation metric, or both; scale the plurality of machine instances allocated to the customer based at least in part on a utilization metric of the plurality of machine instances, a cost factor, or both; and migrate one of the suite of multimedia telephony services from a first one of the plurality of machine instances to a second one of the plurality of machine instances in response to the scaling.

2. The non-transitory computer-readable medium of claim 1, wherein the at least one program further causes the at least one computing device to at least allocate another one of the plurality of machine instances to the customer and configure the other one of the plurality of machine instances to provision one of the suite of multimedia telephony services.

3. The non-transitory computer-readable medium of claim 1, wherein the at least one program further causes the at least one computing device to at least deallocate one of the plurality of machine instances that are allocated to the customer.

4. A system, comprising: a networked plurality of computing devices; an electronic data store configured to at least store specific computer-executable instructions; a plurality of machine instances hosted in the networked plurality of computing devices, wherein at least two of the plurality of machine instances are hosted by a single network computing device of the plurality of computing devices; and a network management service executable in the networked plurality of computing devices, the network management service in communication with the electronic data store and configured to execute the specific computer-executable instructions to at least: allocate the plurality of machine instances to a customer in response to an initial setup request; configure the plurality of machine instances to provision a suite of multimedia telephony services for a plurality of users associated with the customer; and configure a gateway in one of the plurality of machine instances to provide connectivity to an external telecommunications network for the suite of multimedia telephony services through a plurality of external peering networks, the external telecommunications network comprising a public switched telephone network (PSTN), the gateway controlling telephony traffic associated with the customer based at least in part on an incorrect messages metric and a traffic reputation metric.

5. The system of claim 4, wherein the external telecommunications network comprises a plurality of telecommunications networks having peering agreements with an operator of the networked plurality of computing devices.

6. The system of claim 4, wherein the suite of multimedia telephony services corresponds to an internet protocol multimedia subsystem (IMS), and the suite of multimedia telephony services comprises a plurality of media controls and a plurality of application services.

7. The system of claim 4, wherein the suite of multimedia telephony services comprises at least one of a scalable number of load balancers or an interactive voice response (IVR) service.

8. The system of claim 4, wherein the suite of multimedia telephony services includes a proxy control configured to establish communications sessions with a plurality of client devices associated with the plurality of users.

9. The system of claim 4, wherein the external telecommunications network further comprises at least one of, a public land mobile network (PLMN), or an internet protocol multimedia subsystem (IMS) network.

10. The system of claim 4, wherein the network management service is further configured to execute the specific computer-executable instructions to at least: determine whether to scale the plurality of machine instances that are allocated to the customer; and scale the plurality of machine instances that are allocated to the customer in response to determining to scale the plurality of machine instances that are allocated to the customer.

11. The system of claim 10, wherein the network management service is further configured to execute the specific computer-executable instructions to at least allocate another one of the plurality of machine instances to the customer and configure the other one of the plurality of machine instances to provision one of the suite of multimedia telephony services.

12. The system of claim 10, wherein the network management service is further configured to execute the specific computer-executable instructions to at least deallocate one of the plurality of machine instances that are allocated to the customer.

13. The system of claim 10, wherein the network management service is further configured to execute the specific computer-executable instructions to at least migrate one of the suite of multimedia telephony services from a first one of the plurality of machine instances allocated to the customer to a second one of the plurality of machine instances allocated to the customer.

14. The system of claim 10, wherein the network management service is further configured to execute the specific computer-executable instructions to at least: determine a cost associated with allocation of the plurality of machine instances to the customer; and wherein the plurality of machine instances are scaled based at least in part on the cost.

15. The system of claim 10, wherein the network management service is further configured to execute the specific computer-executable instructions to at least: monitor a metric associated with utilization of the suite of multimedia telephony services by the customer; determine whether the metric meets a threshold; and wherein the plurality of machine instances are scaled in response to determining that the metric meets the threshold.

16. The system of claim 4, wherein the electronic data store is scalable, and the network management service is further configured to execute the specific computer-executable instructions to at least log telephony traffic associated with the customer to the electronic data store.

17. The system of claim 16, wherein the telephony traffic logged comprises a recorded voice call.

18. The system of claim 4, wherein the customer is a first customer of a plurality of customers, and the network management service is further configured to execute the specific computer-executable instructions to at least allocate a second plurality of machine instances to a second customer of the plurality of customers in response to a second initial setup request and configure the second plurality of machine instances to provision a second suite of multimedia telephony services for a second plurality of users associated with the second customer.

19. A method comprising: allocating a plurality of virtual machine instances to a customer in response to an initial setup request to provide a suite of multimedia telephony services for a plurality of users associated with the customer, the plurality of virtual machine instances being hosted by a networked plurality of computing devices; configuring, in the networked plurality of computing devices, the plurality of virtual machine instances to set up the suite of multimedia telephony services; providing, in the networked plurality of computing devices, connectivity to an external telecommunications network for the suite of multimedia telephony services through a plurality of external peering networks, the external telecommunications network comprising a public switched telephone network (PSTN); controlling, in the networked plurality of computing devices, telephony traffic associated with the customer based at least in part on an incorrect messages metric and a traffic reputation metric; determining, in the networked plurality of computing devices, whether to scale the plurality of virtual machine instances; and scaling, in the networked plurality of computing devices, the plurality of virtual machine instances allocated to the customer in response to determining to scale the plurality of virtual machine instances.

20. The method of claim 19, further comprising migrating, in the networked plurality of computing devices, one of the suite of multimedia telephony services from a first one of the plurality of virtual machine instances to a second one of the plurality of virtual machine instances in response to scaling the plurality of virtual machine instances allocated to the customer.

21. The method of claim 19, further comprising aggregating, in the networked plurality of computing devices, first telephony traffic associated with the customer with second telephony traffic associated with a plurality of other customers before routing the first telephony traffic and the second telephony traffic to the external telecommunications network.

22. The method of claim 19, wherein determining whether to scale the plurality of virtual machine instances allocated to the customer further comprises determining, in the networked plurality of computing devices, whether to scale the plurality of virtual machine instances based at least in part on a customer associated threshold and a metric.

23. The method of claim 22, wherein the metric relates to a current cost associated with allocation of the plurality of virtual machine instances.

24. The method of claim 22, wherein the metric relates to a current utilization associated with the suite of multimedia telephony services.

25. The method of claim 19, wherein the suite of multimedia telephony services provides video telephony, voice telephony, and text messaging services.

26. The method of claim 19, further comprising establishing, by a proxy control in the suite of multimedia telephony services, an encrypted session via a network with a user agent executed by a client device.

27. The method of claim 19, further comprising configuring, in the networked plurality of computing devices, a virtual private network among the plurality of virtual machine instances.

28. The method of claim 19, further comprising: providing, in the networked plurality of computing devices, connectivity to a plurality of user equipment associated with the plurality of users for a proxy controller from the suite of multimedia telephony services, the connectivity being encrypted via at least one of: a virtual private network tunnel, a transport layer security (TLS), or a secure socket layer (SSL).

* * * * *